United States Patent [19]
Laudenberg

[11] Patent Number: 5,906,438
[45] Date of Patent: May 25, 1999

[54] FLEXIBLE POUCH-TYPE PACKAGE HAVING RECLOSEABLE CLOSURE

[75] Inventor: Bernd Laudenberg, Wipperfurth, Germany

[73] Assignee: Profile Packaging, Inc., Sarasota, Fla.

[21] Appl. No.: 08/970,335

[22] Filed: Nov. 14, 1997

Related U.S. Application Data

[60] Provisional application No. 60/030,976, Nov. 15, 1996.

[51] Int. Cl.⁶ ..................................................... B65D 33/24
[52] U.S. Cl. .............................................. 383/63; 383/107
[58] Field of Search ................................. 383/63, 107, 65

[56] References Cited

U.S. PATENT DOCUMENTS

| | | | |
|---|---|---|---|
| 4,655,862 | 4/1987 | Christoff et al. | 383/63 X |
| 4,658,433 | 4/1987 | Savicki | 383/107 X |
| 5,002,781 | 3/1991 | Van Erden | 383/63 X |
| 5,036,645 | 8/1991 | Schwarz | 383/63 X |
| 5,221,144 | 6/1993 | Schwarz et al. | 383/63 |
| 5,273,511 | 12/1993 | Boeckman | 383/63 X |

*Primary Examiner*—Jes F. Pascua
*Attorney, Agent, or Firm*—Gifford, Krass, Groh, Sprinkle, Anderson & Citkowski, P.C.

[57] ABSTRACT

A plastic, pouch-type package with a recloseable, zipper-like closure and the method of making it in which the mass of the plastic closure is reduced at opposite side edges of the pouch by forming holes passing through the interlocking tongue and groove portions so that the subsequent application of heat and pressure along parting lines at the side edges of the pouch accomplishes fusion and sealing of the closure to the pouch with less time and heat than would otherwise be required.

4 Claims, 2 Drawing Sheets

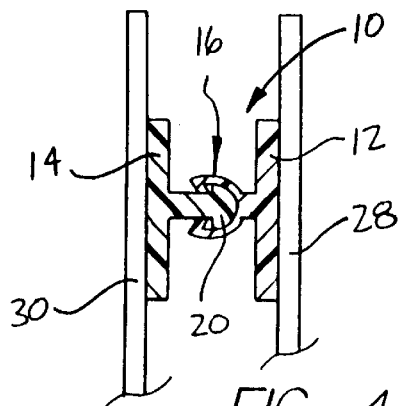
FIG-4
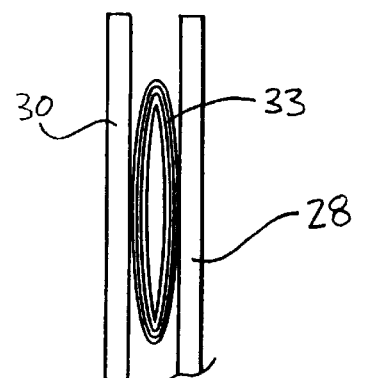
FIG-5
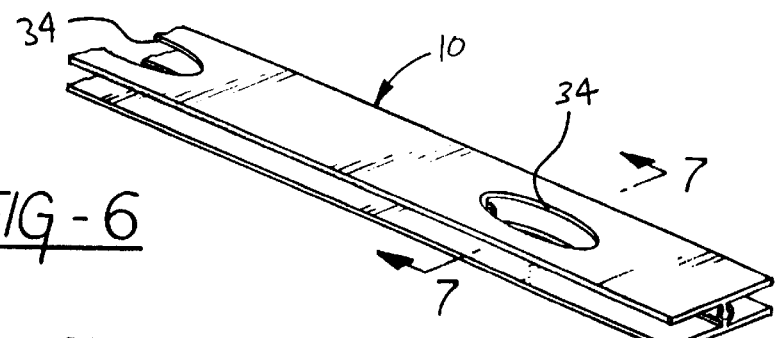
FIG-6
FIG-7
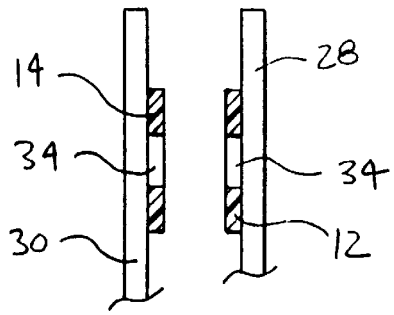
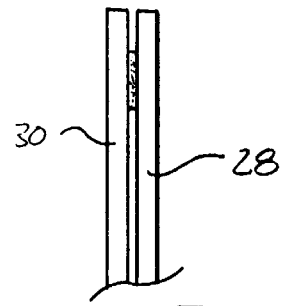
FIG-8
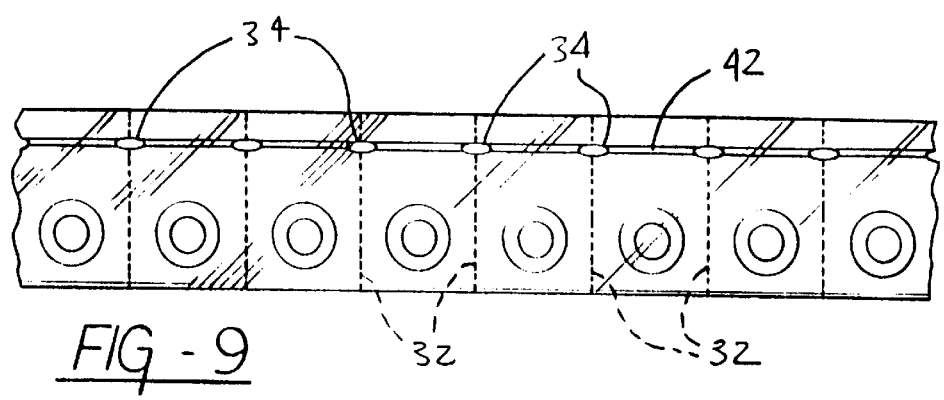
FIG-9

FLEXIBLE POUCH-TYPE PACKAGE HAVING RECLOSEABLE CLOSURE

This application claims the benefit of U.S. Provisional Application No: 60/030,976 filed Nov. 15, 1996.

This invention relates to flexible, pouch-type packages having recloseable zipper-like closures and more particularly to the method and apparatus for adding the closure or zipper structure to the pouch.

Pouch-type packages are usually formed of a sheet material which incorporates plastic and the zipper closure structure is added at the open end of the package. The zipper closure also is of a plastic material and requires careful attention to the attachment in the areas at the opposite ends of the finished flat package. Pouches typically are made in a continuous form and must be separated from adjoining pouches at a line of separation. Such lines of separation typically are at the opposite side edges of the pouch and pass through opposite ends of the zipper fastener. Such lines of separation are formed by heat which seals the walls of the pouches and also must heat the plastic zipper closure so that it is bonded to the walls of the pouch. The zipper structure has a thickness substantially more than the thickness of the walls of the pouch and the entire mass must be subject to sufficient heat to melt the plastic so that it will fuse together. This requires substantial heat and time. If sufficient heat is not used, leakage often results and if excess heat is used, the plastic is burned. Heat usually is applied by ultra-sonic or resistant heaters and when the material becomes molten, pressure is applied to cause the molten plastic to be flattened and subsequent cooling results in bonding. Such heating and the application of pressure is time consuming and limits the speed of operation of the machine forming the pouches.

The problems of the prior art are overcome by the disclosed zipper fastener and the machine and the method of applying the zipper to pouches. The zipper itself is formed with uniformly spaced areas in which the mass of the zipper has been reduced conforming to the width of the pouch. The zipper is then fed to the machine and placed in proximity to the upper end of the folded sheet of material forming the front and rear panels of the pouch. The zipper is bonded to the opposite inner wall surfaces of the pouch and the opposite side edges of the pouch are sealed along parting lines extending transversely to the elongated zipper and passing through the uniformly spaced areas of reduced mass in the zipper. Such sealing is accomplished by heating along the parting line which passes through the areas and as a result of the reduction in the mass of the plastic, faster heating and improved sealing of the opposite ends of the zipper closure are achieved.

It is an object of the invention to provide elongated, recloseable, zipper-like closure for use in the manufacture of pouches in which the mass of the zipper has been reduced at selected locations corresponding to the opposite ends of the closure in the finished product so that less heat and pressure is required for the attachment of the zipper to the pouch.

DESCRIPTION OF THE DRAWINGS

FIG. 4 is an enlarged cross-sectional view of the zipper-like fastener shown in FIG. 3;

FIG. 5 is a view similar to FIG. 4 depicting the large mass of plastic material after it has been heated to a molten state and cooled;

FIG. 6 is a perspective view of the zipper-like fastener of the present invention;

FIG. 7 is a view similar to FIG. 4 taken on line 7—7 in FIG. 6;

FIG. 8 is a view similar to FIG. 5 showing smaller molten mass resulting from the zipper-like closure of the present invention; and FIG. 9 is a diagrammatic view illustrating the position of the reduced mass areas in the zipper-like closure in the present invention in relationship to parting lines of the pouches being manufactured.

DETAILED DESCRIPTION

Figure 3:
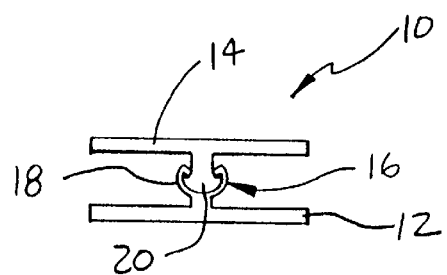
FIG. 3 is an enlarged sectional view of the zipper-like recloseable fastener.

Referring to the drawings and particularly to FIG. 3, the zipper-like recloseable fastener structure in the present invention is designated generally at 10 and is formed of two bands or skirts 12 and 14 held together at a common bead 16 which includes the grooved portion 18 attached to the skirt 12 and a tongue portion 20 attached to the skirt 14. Such zipper fasteners 10 typically are supplied in the closed condition as illustrated in FIG. 3 and are rolled on reels for transport.

During manufacture, pouches 22 are formed on a horizontal flat machine which, by way of example, can be of a type manufactured by Laudenberg Machinery, Inc., generally designated as Model FBM. Such machines can be used for manufacturing a large variety of relatively flat pouches.

Figure 1:
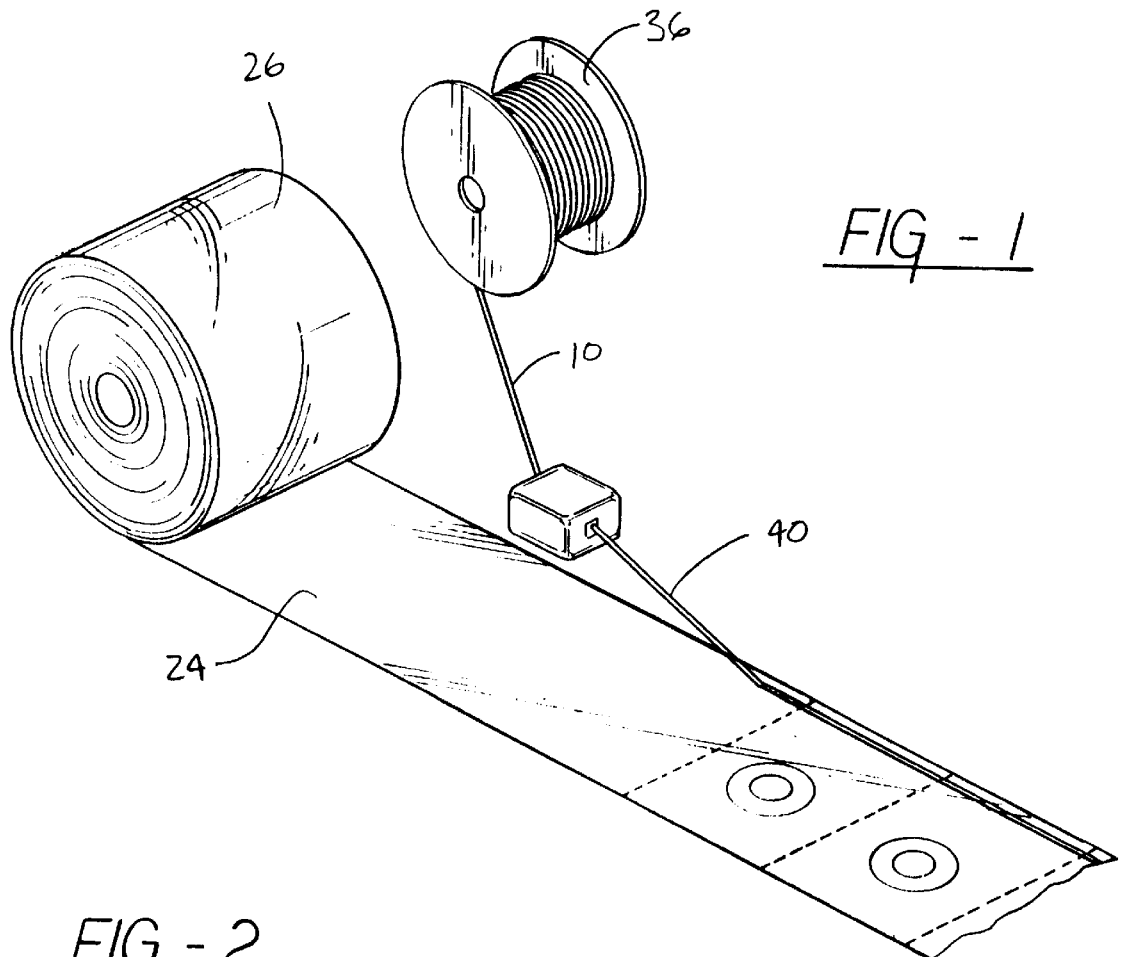
FIG. 1 is a diagrammatic view depicting the machinery by which the recloseable closure of the present invention is applied to the pouch during the process of manufacture.

Such pouches 24 are made from a continuous web or sheet 24 of plastic foil material fed from a roll 26 as seen in FIG. 1. Such material typically is laminated of plastic material with one of the surfaces of sealant plastic which can be melted upon the application of heat to fuse and bond to a like surface upon cooling. The sheet 24 is folded so that the sealant surfaces face each other at the interior of the package and so that one half of the sheet 24 forms the front panel 28 and the other half forms the rear panel 30. The zipper assembly 10 is bonded to the interior wall surfaces of the front and rear panels 28, 30 to form the recloseable closure.

Figure 2:
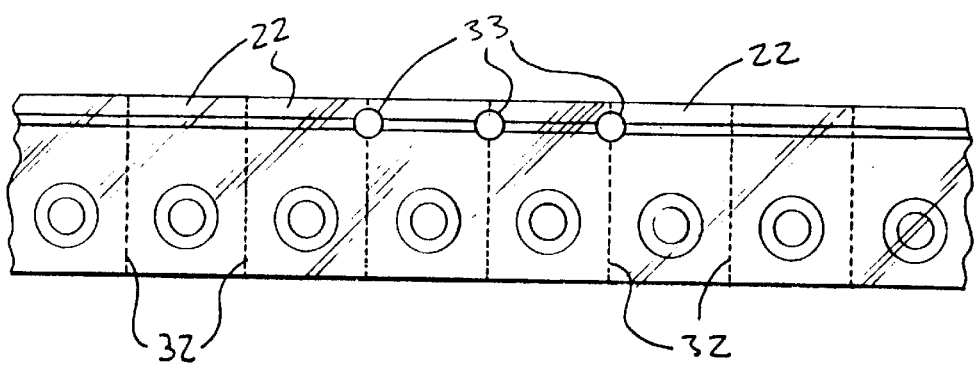
FIG. 2 is a view of a continuous string of pouches as they appear during the manufacturing process and prior to separation.

As seen in FIG. 4, the zipper-type assembly 10 is bonded to the interior surface of the panels 28 and 30 in slightly spaced relationship to the top edge of the panels. Additionally, the zipper assembly 10 must be bonded at parting lines indicated at 32 in FIG. 2. More specifically, the areas at which the closure 10 is bonded to the side edges of the pouches 22 is indicated in circled areas at 33 in FIG. 2. This area is further shown enlarged in FIG. 5 and indicates a large mass of plastic material at 35. This large mass is the result of plastic in the zipper-like closure 10 disposed between the panels 28 and 30 in the area of the parting lines 32.

In accordance with the present invention, the mass 35 of zipper-like closure 10 is reduced by forming apertures 34 in the zipper assembly 10 which are uniformly spaced from each other to conform to the spacing of the parting lines 32.

The removed material from the zipper 10 is a portion of the bead 16 including the groove portion 18 and tongue portion 20 and leaving the opposed edges of the zipper skirts 12 and 14 as can be seen from a comparison of FIGS. 4 and 7. Other methods may be used to remove the bead portion 16 but apertures 34 have been found satisfactory and can be easily formed at high speed.

The formation of the apertures 34 can occur simultaneously with the formation of the pouches 22. For example, as viewed in FIG. 1, the foil 24 is fed from the reel 26 to form pouches 22. At a station just prior to the formation of the pouches 22, the closure 10 can be fed in a continuous strip from a reel 36 to a machine attachment 38 which punches the apertures 34. Thereafter, the zipper closure assembly 10 with apertures 34 is fed in continuous form to position it relative to the foil forming the pouches 22.

The zipper 10 with apertures 34 is positioned relative to the pouches 22 along a line indicated at 42 in FIG. 9. The apertures 34 will be aligned with parting lines 32. As seen in FIG. 7, the mass of material between panels 28 and 30 has been substantially reduced from the large mass of material as seen in FIG. 4. The subsequent application of heat at opposite sides and along the parting lines 32 and line 42 serves to place the materials of the inner walls of the panels 28 and 30 as well as the remaining portions of the zipper skirts 12 and 14 in a molten state so that the application of pressure and subsequent cooling results in bonding and sealing of the bands 12 and 14 as well as the opposite ends of zipper 10 to panels 28 and 30.

A flexible package with a plastic zipper-like closure and the method of making it is formed by facing panels of plastic material and with a zipper closure disposed between and at one edge of the panels. The usual tongue and groove portion of the plastic closure is removed at portions corresponding to the width of the package so that heat and pressure can be more uniformly applied when the panels are sealed together.

I claim:

1. A flexible plastic pouch comprising:
   a pair of facing panels, each of said pair of panels having a pair of spaced apart side edges,
   a recloseable, plastic, zipper-like closure having a pair of bands with one band having a tongue portion and the other of said bands having a groove portion, each of said bands extending continuously between said pair of side edges and being fused to one of said panels adjacent to a top edge of said panels to be integral therewith, said tongue portion and groove portion at localized portions of said closure and corresponding to the width of said pouch being removed from said zipper-like closure a distance inwardly from each of said side edges to minimize the amount of plastic material, and said panels and localized portions of said closure being fused to each other along lines at said side edges of said panels to form a closed pouch.

2. A flexible plastic pouch of claim 1 wherein said reclosable, plastic, zipper-like closure has holes formed in said closure when it is in its. assembled condition to remove said tongue and groove portions at said localized portions of said closure.

3. A flexible pouch comprising:
   a pair of panels, each panel having a pair of spaced apart side edges, said panels being joined together along each said side edges;
   a recloseable, plastic, zipper-like closure having a pair of bands, each of said bands having a skirt portion extending between a pair of ends, one of said bands having a tongue portion extending longitudinally along said skirt portion and another of said pair of bands having a groove portion extending longitudinally along skirt portion, said bands being affixed to a respective one of said panels, said tongue portion and said groove portion having a length less than a length of said skirt portion, said skirt portions having a pair of flat end portions extending between said tongue and groove portions to said side edges of said panels.

4. The pouch of claim 3 further having an opening formed in said end portion of each of said skirt portions.

* * * * *

UNITED STATES PATENT AND TRADEMARK OFFICE
CERTIFICATE OF CORRECTION

PATENT NO. : 5,906,438
DATED : May 25, 1999
INVENTOR(S) : Bernd Laudenberg

It is certified that error appears in the above-identified patent and that said Letters Patent are hereby corrected as shown below:

Column 4, line 14 , after "its" delete "."

Column 4, line 27, after "along" insert --said--.
Column 4, line 32, delete "between" and insert --from--.

Signed and Sealed this

Eighteenth Day of January, 2000

Attest:

Q. TODD DICKINSON

Attesting Officer     Commissioner of Patents and Trademarks

UNITED STATES PATENT AND TRADEMARK OFFICE
CERTIFICATE OF CORRECTION

PATENT NO. : 5,906,438

DATED : May 25, 1999

INVENTOR(S) : Bernd Laudenberg

It is certified that error appears in the above-identified patent and that said Letters Patent is hereby corrected as shown below:

Column 2, line 34, delete "24" and insert --22--.
Column 3, line 23, delete "and the method of making it".
Column 4, line 20, after "each" insert --of--.

Signed and Sealed this

Twenty-ninth Day of August, 2000

Attest:

Attesting Officer

Q. TODD DICKINSON

*Director of Patents and Trademarks*